United States Patent
Belanger et al.

(10) Patent No.: US 8,738,702 B1
(45) Date of Patent: May 27, 2014

(54) METHOD AND SYSTEM FOR A PERSONALIZED CONTENT DISSEMINATION PLATFORM

(75) Inventors: David Belanger, Hillsborough, NJ (US); Sam Parker, Cranbury, NJ (US); Sarat Puthenpura, Berkeley Heights, NJ (US); Wenjie Zhao, Princeton, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1561 days.

(21) Appl. No.: 11/180,212

(22) Filed: Jul. 13, 2005

(51) Int. Cl.
*G06F 15/16* (2006.01)

(52) U.S. Cl.
USPC .......................... 709/205; 705/14; 379/88.18

(58) Field of Classification Search
USPC ................. 709/206; 715/201–204; 705/14; 379/88.18
See application file for complete search history.

(56) References Cited

U.S. PATENT DOCUMENTS

| | | | | |
|---|---|---|---|---|
| 7,630,905 B1* | 12/2009 | Reese | | 705/1.1 |
| 2002/0035474 A1* | 3/2002 | Alpdemir | | 704/270 |
| 2002/0059398 A1* | 5/2002 | Shimabukuro | | 709/218 |
| 2002/0087573 A1* | 7/2002 | Reuning et al. | | 707/102 |
| 2002/0147643 A1* | 10/2002 | Olsen et al. | | 705/14 |
| 2002/0191219 A1* | 12/2002 | Bondy et al. | | 358/1.18 |
| 2003/0041021 A1* | 2/2003 | Kogler et al. | | 705/38 |
| 2003/0125958 A1* | 7/2003 | Alpdemir et al. | | 704/275 |
| 2004/0083131 A1* | 4/2004 | Kaufman et al. | | 705/14 |
| 2004/0143841 A1* | 7/2004 | Wang et al. | | 725/32 |
| 2005/0144073 A1* | 6/2005 | Morrisroe et al. | | 705/14 |
| 2005/0177463 A1* | 8/2005 | Crutchfield et al. | | 705/27 |
| 2006/0041624 A1* | 2/2006 | Lyle et al. | | 709/206 |
| 2006/0075019 A1* | 4/2006 | Donovan et al. | | 709/203 |
| 2006/0212810 A1* | 9/2006 | Segal et al. | | 715/530 |
| 2006/0282379 A1* | 12/2006 | Wordekemper et al. | | 705/40 |

* cited by examiner

*Primary Examiner* — Duyen Doan

(57) ABSTRACT

The disclosure provides a method and corresponding system for personalizing and disbursing content material in an automated fashion based on differing characteristics or profiles of the recipients. The system includes a database of potential recipients with key characteristics such as location data, revenue, product ownership, customer status, tenure with the company/organization, payment status, credit rating, whether they have recently responded to other material, and the like. Dissemination media include email communications, collaterals, brochures, textual materials, image and video information, and any similar media, where the contents of the communication material is customized based on the key characteristics profiles of the recipients and driven by a set of business rules that can be adapted to fit various scenarios.

7 Claims, 4 Drawing Sheets

400

Dear James:

Are you interested in an easy to use, easy to grow service that is reliable and flexible? Do you want a local service partner that brings over 100 years of experience to the table? Let me tell you how AT&T's Ethernet Local Private Line service can make a solid difference in *your* business!

AT&T's Ethernet Local Private Line service, a.k.a. *Metropolitan Ethernet*, can provide you with high bandwidth Ethernet connectivity between locations within a metropolitan area. The service includes:Point-to-Point Dedicated Circuit Five fixed BandwidthsAT&T's Metropolitan Ethernet point-to-point service, which is designated for Intra-LATA connectivity, provides high-speed connections between locations with a variety of speeds to meet your needs:50
Mbps 150
Mbps 300
Mbps 600
Mbps 1
GbpsI will be contacting you shortly to personally discuss how AT&T's Ethernet Local Private Line service can provide flexibility and reliability at an affordable cost. You can also reach me directly at 973236x749 or email me at xxxx@att.com. I look forward to talking with you soon!

Sincerely,

Wenjie Zhao
AT&T Representative

Here is the info you have requested. Please review.

* Conditions and restrictions apply. Ask your representative for details.

This is a solicitation from AT&T.

If you no longer wish to receive email information from AT&T, please follow this link. Or send notice to: AT&T Business, 55 Corporate Drive, Room 24C27, Bridgewater, NJ 08807

If you are an existing AT&T customer, you may still receive transactional e-mail messages concerning your current products or services.

FIG. 4

METHOD AND SYSTEM FOR A PERSONALIZED CONTENT DISSEMINATION PLATFORM

TECHNICAL FIELD

This disclosure generally relates to data processing for automated systems, and in particular it relates to automated business and marketing communications programs.

BACKGROUND OF THE DISCLOSURE

Companies or other organizations often have a need to communicate content material (such as marketing promotions, announcements, training documentation, operations methods and procedures, special brochures, and the like) to its current and prospective customers or members. Presently, generalized communications may be readily assembled without variation and sent to a group of intended recipients in an automated fashion. However, and frequently, a single communication may not be universally applicable to each and every intended recipient in the group, or additional information may need to be given to certain of the individual recipients. For example, one may wish to send promotional materials regarding price discounts in such a way that current higher revenue customers receive offers with a larger discount. Similarly, one may wish to send brochures or other material that is different for recipients in different geographical locations.

In such instances, it is possible to include personalized content for one or more recipients in a group in today's mass communication systems, but this involves a good deal of manual work, including separating the content and confirming that the right material goes to the correct recipient. These manual processes can be costly, slow, and limit the overall throughput of communications for an organization. In addition to the issue of personalizing outbound communications, companies and organizations often have a problem linking any recipient responses to the outgoing information that prompted the response.

Accordingly, there is a need for a method and apparatus for personalized content dissemination that addresses certain problems of existing technologies.

SUMMARY OF THE DISCLOSURE

The present disclosure, therefore, introduces a method and apparatus for disseminating content based on stored profile information of recipients of a communication. The communication includes fixed information that is transmitted to all recipients of the communication, as well as variable information that is included in separate versions of the communication based on the profile data of individual recipients. A communication is generated according to customization rules applied to profile data available for each recipient, and then individual versions of the communication having the appropriate fixed and variable data are transmitted to individual recipients. After a response to the communication is received from a recipient, the response is analyzed and a subsequent communication may be generated and transmitted to that recipient based on the response and the profile data of that recipient.

The disclosed processes are particularly suited to marketing and promotions materials, including those providing offers for telecommunications products and services, but may be applied and adapted to any of a variety of commercial uses.

BRIEF DESCRIPTION OF THE DRAWINGS

Further aspects of the present disclosure will be more readily appreciated upon review of the detailed description of its various embodiments, described below, when taken in conjunction with the accompanying drawings, of which:

FIG. 4 is a depiction of an exemplary communication containing fixed and variable data generating by the process of FIG. 3.

DETAILED DESCRIPTION OF THE SPECIFIC EMBODIMENTS

Referring now to FIGS. 1-4, wherein similar components of the present disclosure are referenced in like manner, various embodiments of a method and system for personalized content dissemination are disclosed.

As more and more customer information is captured or available electronically, an organization can utilize a computer system, as disclosed herein that allows for automatic dissemination of content materials, which may be customized or personalized for individual recipients based on any stored profile data or as otherwise desired by an operator of the computer system. The computer system may include a set of hardware and software components that provide flexibility, scaling, and extensibility with regard to any form of communication media. By automatically profiling recipients and generating content according to customizable rules, a particularly expensive problem that is common to many businesses is readily solved. Moreover, the computer system allows for tracking and capture of responses from recipients, thereby providing an effective way to monitor the effectiveness of a communication or related promotion.

Figure 1:
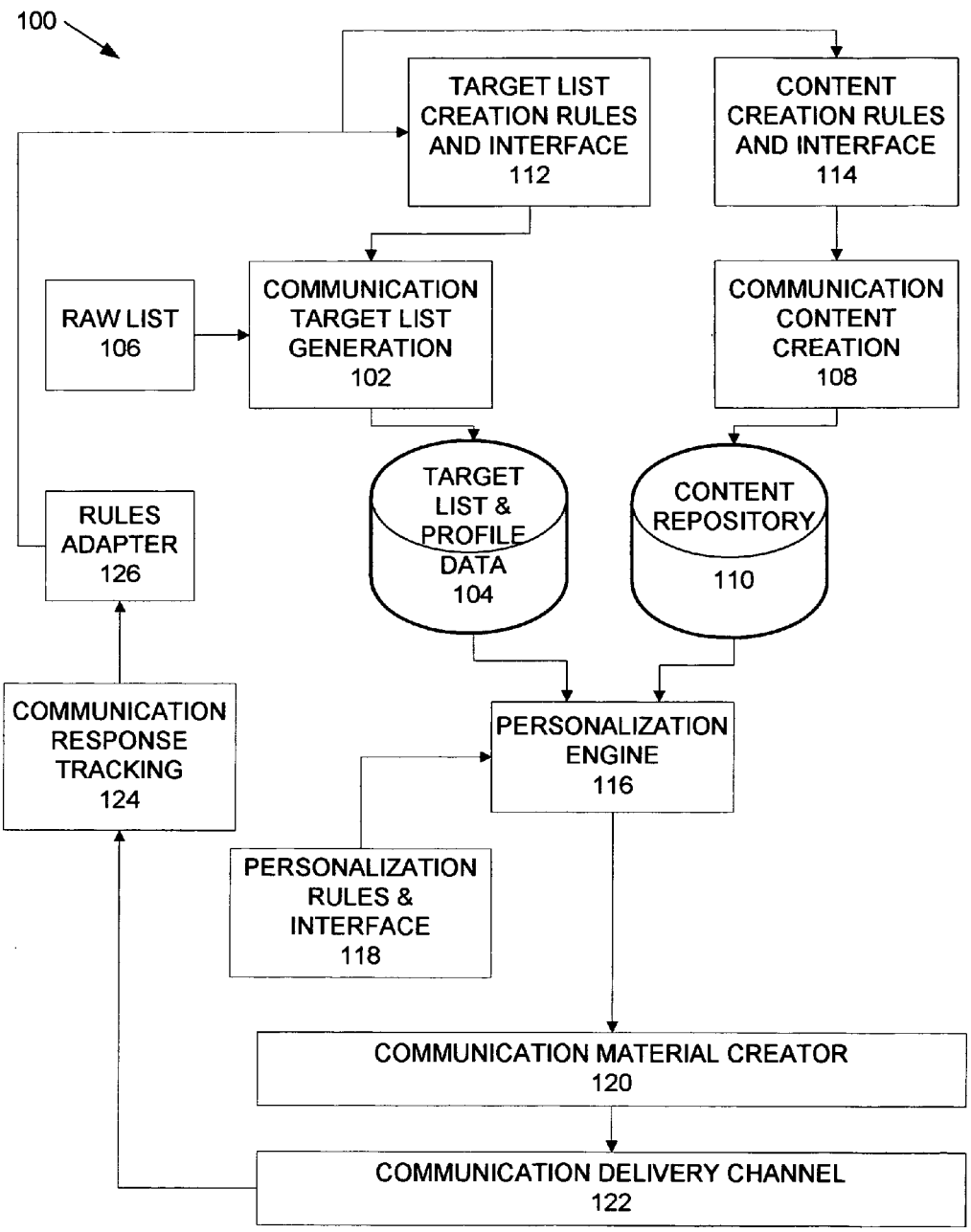
FIG. 1 is an exemplary computer architecture over which the processes of the present disclosure may be performed.

Turning now to FIG. 1, there is depicted a block diagram of an exemplary computer system architecture 100 for implementing the methods disclosed herein. The computer system architecture 100 may be implemented in software having programmed instructions in a machine-readable language, which are stored in internal or external memory of a computer and are executed by a processor thereof. The computer may be a single computing device, such as an enterprise network server, or a centralized or distributed group of computers, any of which may be of the type commonly manufactured by COMPAQ, HEWLETT-PACKARD, IBM, APPLE and SUN. Such computers may use any one or more of the following operating systems: IBM OS/2 WARP 3 AND 4, LINUX, MAC OS, UNIX, SCO UNIX, SUN SOLARIS, and WINDOWS 3.1/95/98/ME/NT/2000/XP. The databases employed by such computers for storing the data required by the processes disclosed herein may include: ORACLE, SAP, INFORMIX, SYBASE, MICROSOFT SQL, MICROSOFT EXCHANGE, DB2 and LOTUS NOTES. Programmed instructions for performing the processes disclosed herein may be authored in any of the following software environments: FLASH, JAVA, and hyper-text mark-up language (HTML). Such programmed instructions may also be provided in any of the wide variety of programming languages commonly used by those of ordinary skill in the art.

In one exemplary embodiment provided herein, the programmed instructions may be generated as a group of co-operative software modules, each having its dedicated functions. The descriptions of such modules will allow one of ordinary skill in the art to readily appreciate the programming instructions required for implementing the disclosed processes herein. However, the programmed instructions themselves can be implemented in wide array of ways, depending, for example, on the operating system and software applications/environments selected, as well as on designer preference.

The various databases and software modules of the computer system architecture 100 may be linked together as shown in FIG. 1. The databases may include: a target list and profile data repository 104, a raw target list 106 and a content repository 110. The raw target list 106 may be a database of all customers and potential customers, and may include some basic level of information such as customer name, location and contact information.

The target list and profile data repository 104 may contain more detailed information for one or more of the customers and potential customers in the raw target list 104. The detailed information may include characteristics of each target customer, such as: an annual income, a purchaser transaction history, prior products and services purchased, a credit rating and a response history to prior communications. Further detailed information may likewise be used.

The content repository 110 may include content for communications to be sent to target recipients by the automated computer system architecture 100. Such content may include text, graphics, audio, visual and audio-visual content and formatting instructions for communications, all of which may be provided in any of a variety of useful electronic formats. In certain embodiments, the content may include a network address of or a hyperlink to an electronic file containing desired content. In certain further embodiments, the content may include an identification of a paper brochure or the like.

The data repositories 104, 106 and 110 above are operated upon by the software modules of the computer system architecture 100, which may include: a communication target list generation module 102, a communication content creation module 108, a personalization rules and interface module 118, a communication material creation module 120, and a rules adapter module 126, all of which are described immediately below. A target list creation rules and interface module 112, content creation rules and interface module 114, personalization engine 116, communication delivery channel interface 122, and communication response tracking interface 124 will be described in more detail later below with respect to FIG. 2.

The communication target list generation module 102 includes programming instructions for creating a target list for a particular communication by identifying a group of recipients having desired characteristics from the target list and profile data repository 104. The module 112 also includes an analytical engine for scoring and segmenting recipients according to their characteristics. For example, a recipient having a high annual income will receive a higher score than a recipient with a lower annual income. The scoring may be based on any other stored characteristics as well as on any history of previous responses received from the recipient for previous communications, as reported by the communication response tracking module 124. The manner for scoring may be accomplished in any of a variety of useful manners that will be readily apparent to one of ordinary skill in the art, and scores and manners of scoring may be continuously adjusted over time based on new information. The functions of the communication target list generation module 102 are accessed by a user through the target list creation rules and interface module 112, described later below.

The communication content creation module 108 includes programming instructions for allowing a user to create content for one or more communications, and for storing such content or identifications of content within the content repository 110. A user may access the communication content creation features through the content creation rules and interface module 114, described later below. The communication content creation module 108 allows for the creation of communications having fixed data that is common to all recipients of a communication, and variable data that may vary with each recipient based on stored in the target list and profile data repository 104. For example, the fixed data may include formatting instructions and common text for an e-mail message to be distributed to a group of users. The variable data may be the name of a recipient, which will be placed in a designated field of the communication, and will be retrieved from a recipient name field or the like in the target list and profile data repository 104.

The personalization rules and interface module 118 includes programming instructions for allowing a user to establish rules for personalizing content to be distributed to an individual recipient or subset of target recipients. Such rules may include, for example, allowing a user to enter a personal message, perhaps of limited length, to a recipient with which the user has had prior dealings. This may be accomplished by presenting a dialog box in which the user is asked to confirm conformance to this rule before the personal message is entered. Any of a variety of additional rules may also be employed. The personalization rules and interface module informs the personalization engine 116, described later below, to generate personalized messages within a communication to be distributed to a group of recipients.

The communication material creation module 120 contains programming instructions for combining information from the communication target list generation module 102, the communication content creation module 108 and the personalization engine 116 to generate a communication having fixed data, variable data and personalized information to be distributed to the group of recipients.

The rules adapter module 126 contains programming instructions for modifying the target list creation rules based on responses tracked by the communication response tracking module 124, described later below. For example, if the response to a widely distributed communication does not meet a set threshold response rate, then the rule adapter module 126 may change one or more variables in the target list creation rules in order to attempt to achieve a larger response with a future communication. This may be accomplished in an automated fashion or by prompting a user to enter new rules and values therefor.

Figure 2:
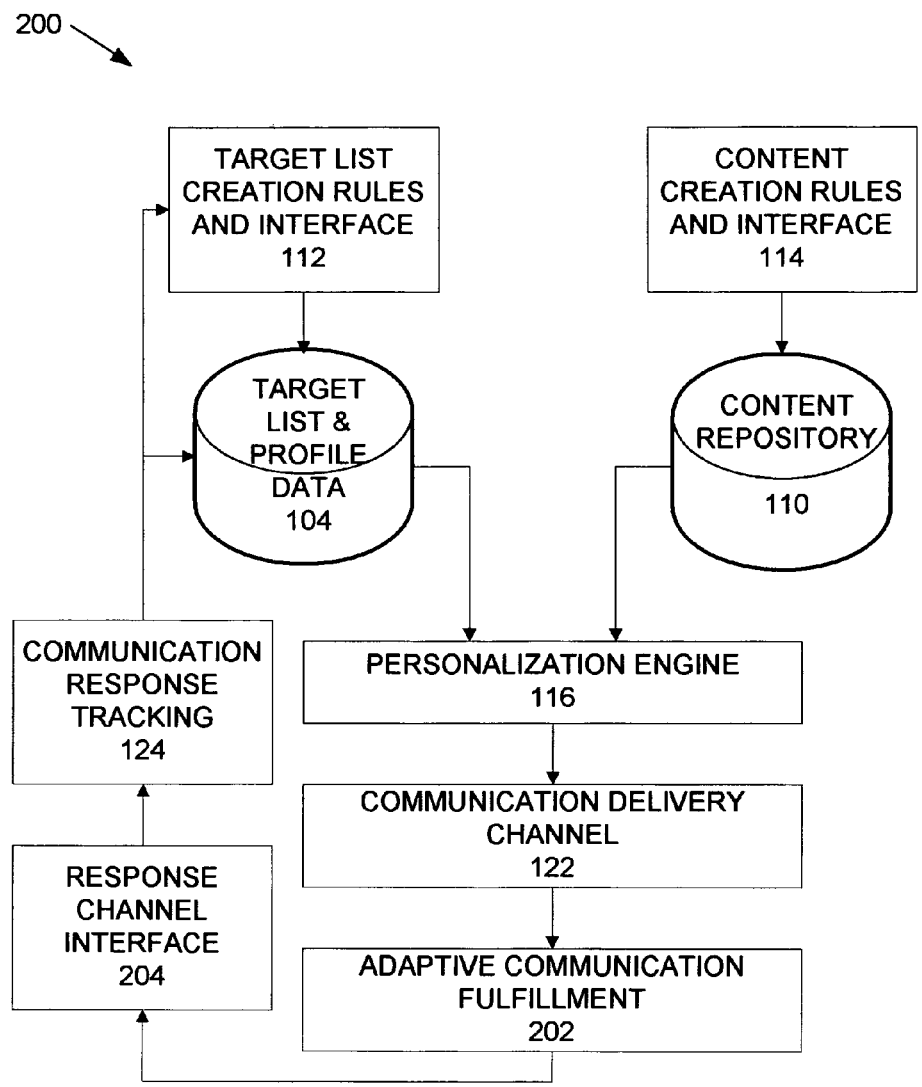
FIG. 2 is a diagram of exemplary software modules that may be used to implement the processes of the present disclosure using the computer architecture of FIG. 1.

Turning now to FIG. 2, therein is depicted a detailed implementation 200 of the following software modules of the computer system architecture 100. The target list creation rules and interface module 112 contains programming instructions allowing a user to enter objectives for a communication, such as assigning a communication to be distributed to recipients having certain desired characteristics. Historical profile and characteristics may be obtained from existing enterprise systems (i.e., from information stored by marketing, customer relationship, billing, customer care, human resource, and or other departments of an organization. The characteristics data may also be obtained from third party information sources, such as credit bureaus and the like. The module 112 also may apply data mining techniques for scoring and segmentation of recipients to identify quality prospective targets for the communication.

The communication content creation module 114 provides a customized user interface to authoring applications (i.e., MICROSOFT OFFICE applications) to enable generation and storage of fixed and variable data for one or more communications. The module 114 allows for the creation of dynamic content templates that, for example, merge static marketing messages and the like with dynamic target profile and characteristic data. The content is stored in content repository 110 to facilitate collaboration, integration and management. The module 110 may utilize a rule-based work flow for content review, approval and rejection prior to storing content in the repository 110.

The communication personalization engine 116 contains programming instructions and a user interface for allowing a user to personalize content based on target profile, historical response, third party intelligence, and the like. Personalized content may include changing the "look and feel" of a communication based on gender, title, historical response, or other characteristic data. Communications may be further personalized according to a preferred delivery channel based of the recipient, as determined by the recipient's preference or historical response. Various rule-based methodologies may also be applied to automate and optimize personalization of communications.

The content delivery channel interface 122 contains programming instructions and a user interface for allowing communications to be published according tot a preferred delivery channel. Communication may be transmitted using the Internet, in order to minimize budget and automate response capture. In such embodiments, the communications may take the form of an electronic mail or instant message. Alternatively, or in addition thereto, the communications may take the form of paper collateral or outbound calls via an IVRU or call center to improve response rates.

The adaptive communication fulfillment module 202 may be optionally provided to generate sample target list for limited trial to preview potential results of a communication and analyze trial responses to provide critical information for communication strategy adjustment, as necessary. The module 202 utilizes a rule-based methodology to automate adaptive fulfillment process, adjust content and delivery channel as necessary.

The communication response tracking module 124 contains programming instructions for identifying and tracking responses from recipients and generating any desired reports relating thereto. For each communication, the module 124 may track the number of communications sent, the number of responses received, the number of positive/negative responses received, the number of follow-up messages sent, the number of responses to follow-up messages, and any sales or the like resulting from the communications. The module 124 may calculate any of a variety of useful statistics regarding the response, which may be used by an organization to evaluate the effectiveness of a message and make any required adjustments thereto. The module 124 may classify un-structured response (such as free form email) via text mining and parsing techniques. Responses may also be entered by users within the organization who have received responses directly from any recipient. Real time statistics may be provided by the module 124 upon request by a user.

The response channel interface 204 contains an interface to any call centers, IVRU servers, e-mail servers, or a user for receiving data on responses that have been received by these entities from any of the recipients of a communication.

Figure 3:
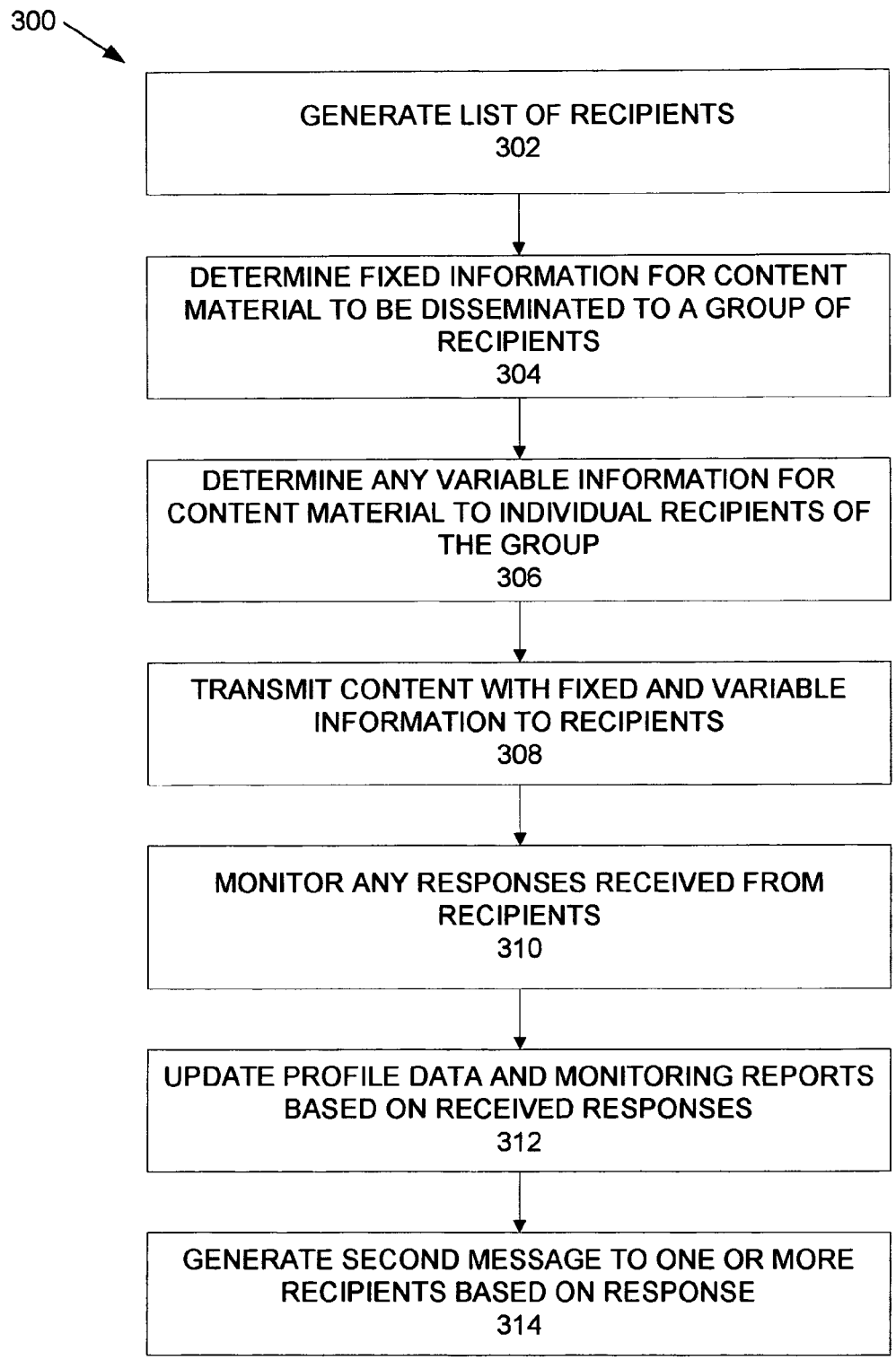
FIG. 3 is a flowchart of an exemplary personalized content dissemination process that may be performed by the software modules of FIG. 2 using the computer architecture of FIG. 1.

Turning now to FIG. 3, there is depicted the steps of an exemplary personalized content dissemination process 300 as may be performed by the computer system architecture 100. The process 300 begins when a user generates a target list of recipients for a particular communication using the target list creation rules and interface 112 (step 302).

The fixed information for the communication is then retrieved from the content repository 110 (step 304). The fixed data may include formatting instructions or a template for the communication, and text or other content that is common to all versions of the communications to be sent.

Next, the variable information for individual versions of the communication are retrieved from the target list and profile data repository 104 (step 306). The variable information may be inserted into designated fields of the communication, and may include a name of the recipient, an address of the recipient, and the like. The variable data may also include individualized information, such as an offer that is provided only to certain recipients having desired characteristics. The variable data may also include personalized messages for one or more intended recipients, as may be generated through the personalization engine 116 described above.

Next, at step 308, the communication with fixed and variable data is transmitted to the recipients through the appropriate communication channel (such as e-mail, interactive voice response unit (IVRU) telephone call, instant message, paper mailing, and the like). The computer system architecture 100 may interface with other systems, such as existing e-mail servers, automated mass mailing assembly systems, IVRU servers and the like to accomplish the distribution of communications.

At step 310, the communication response tracking module 124 tracks any responses received for the communication sent to the group of recipients. The module 124 may include interfaces for users to enter any incidences of responses received from a recipient, or may be programmed to track any incoming e-mail messages or electronic or telephonic communications from an address or telephone number of a recipient of a communication.

Next, at step 312, the communication response tracking, module updates profile data in repository 104 and may generate reports periodically or on demand based on communications sent and the number and types of responses received from recipients. Response types may be determined based on entries of users within the organization who review the response, or may, in the case of electronic communications, be determined using any of a variety of known text parsing algorithms and the like to determine if the response is positive or negative.

Finally, at step 314, a follow-up (e.g., a second or subsequent) message may be automatically generated or established by a user in reply to the response from the recipient Multiple communications can be delivered to targeted audience based on the response from the initial marketing message in this manner. For instance, if a potential customer is interested in product A based on a received response to an initial marketing communication, then subsequent messages can be targeted to the same potential customers, and may be delivered at any future time. Such follow-up messages may include an invitation to a future trade show, seminar or product demonstration that is geographically convenient for the potential customer.

Referring now to FIG. 4, therein is depicted exemplary content material 400 generated using the computer system architecture 100. The content material 400 may include any include fixed and variable text data and may take the form of an e-mail communication, an instant message or paper mailing. The content material 400 can be static in presentation or may contain multi-media images and sounds. The content material 400 may be provided in any of a variety of useful electronic formats.

Prior technologies have failed to provide a content dissemination system that automatically profiles recipients from a target list subject to definable rules (which can be specified in a user-friendly manner), develop communication materials with fixed and variable data based on stored profile data, and provide closed-loop tracking of responses to marketing communications and follow-up messages thereto. The commercial benefit of the content dissemination system is both (i) reduced costs for sending personalized content material to groups of recipients and (ii) potentially increased revenues from more effective marketing communications using the disclosed system.

It is readily contemplated that there will exist many other ways to implement the processes introduced herein, for example by using a variety of equivalent hardware and software components to accomplish substantially the same functionality. Although the best methodologies have been particularly described in the foregoing disclosure, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:

1. A method for transmitting a communication, comprising:
   storing, by a processor, characteristics data for a plurality of consumers, the characteristics data comprising an annual income and a credit rating for each of the plurality of consumers;
   generating, by the processor, the communication for dissemination to the plurality of consumers, the communication comprising a marketing message, the communication including fixed data that is presented to each of the plurality of consumers and variable data that is based on the characteristics data of each consumer receiving the communication, the fixed data comprising a template for the marketing message, the variable data comprising information on a specific marketing offer, the specific marketing offer comprising an offer of a specific product, the communication comprising a telephonic communication;
   presenting, by the processor, an option to a human user to insert a personal message in the communication for a first consumer of the plurality of consumers, wherein the personal message is personalized to the first consumer, wherein the personal message satisfies a conformance rule, wherein the personal message is certified as conforming to the conformance rule before the personal message is entered in the communication, wherein the certifying conformance to the conformance rule comprises confirming from the user that the personal message does not exceed a predetermined length before the personal message is inserted in the communication;
   transmitting, by the processor, the communication to the first consumer, wherein the communication is transmitted to the first consumer including the personal message;
   receiving, by the processor, a response to the communication from the first consumer;
   generating, by the processor, a subsequent communication for the first consumer based on the response and the characteristics data of the first consumer; and
   transmitting, by the processor, the subsequent communication to the first consumer.

2. The method of claim 1, the response comprising a command entered into an interactive voice response unit by the first consumer.

3. The method of claim 1, wherein the specific product comprises a telecommunications product.

4. A method for transmitting a marketing communication, comprising:
   storing, by a processor, profile data for a plurality of recipients;
   storing, by the processor, a template for the marketing communication, the template comprising a marketing message, the template including universal information that is transmitted to all recipients of the marketing communication, the marketing communication comprising a telephonic communication;
   storing, by the processor, a plurality of sets of variable information to be included in the marketing communication based on the profile data of individual recipients, the profile data comprising an annual income and a credit rating for each of the plurality of recipients, where each of the plurality of sets of variable information comprises information on a specific marketing offer, the specific marketing offer comprising an offer of a specific product;
   presenting, by the processor, an option to a human user to insert a personal message in the marketing communication for a first recipient of the plurality of recipients, wherein the personal message is personalized to the first recipient, wherein the personal message satisfies a conformance rule, wherein the personal message is certified as conforming to the conformance rule before the personal message is entered in the marketing communication, wherein the certifying conformance to the conformance rule comprises confirming from the user that the personal message does not exceed a predetermined length before the personal message is inserted in the communication;
   transmitting the marketing communication to the first recipient of the plurality of recipients, the marketing communication including a first set of the plurality of sets of variable information based on the profile data corresponding to the first recipient and including the personal message;
   transmitting the marketing communication to a second recipient of the plurality of recipients, the marketing communication including a second set of the plurality of sets of variable information based on the profile data corresponding to the second recipient;
   receiving a response to the marketing communication from the first recipient;
   generating a second marketing communication for the first recipient based on the response and the profile data of the first recipient; and
   transmitting the second marketing communication to the first recipient.

5. The method of claim 4, the response comprising a command entered into an interactive voice response unit by the first recipient.

6. The method of claim 4, further comprising:
   receiving a response to the marketing communication from the second recipient;
   generating a third marketing communication for the second recipient based on the response from the second recipient and the profile data of the second recipient; and transmitting the third marketing communication to the second recipient.

7. An apparatus for transmitting a marketing communication, comprising:
   a processor; and
   a memory storing:
   profile data for a plurality of recipients; a template for the marketing communication, the template comprising a marketing message, the template including universal information that is transmitted to all recipients of the marketing communication, the marketing communication comprising a telephonic communication;
   sets of variable information to be included in the marketing communication based on the profile data of individual recipients, the profile data of individual recipients comprising an annual income and a credit rating for each of the plurality of recipients, where each of the sets of variable information comprises information on a specific marketing offer, the specific marketing offer comprising an offer of a specific product; and
   a plurality of processing instructions which, when executed by the processor, cause the processor to perform operations, the operations comprising:
   presenting an option to a human user to insert a personal message in the marketing communication for a first recipient of the plurality of recipients, wherein the personal message is personalized to the recipient, wherein the personal message satisfies a conformance rule, wherein the personal message is certified as conforming to the conformance rule before the personal message is entered in the marketing communication; wherein the certifying conformance to the conformance rule comprises confirming from the user that the personal message does not exceed a predetermined length before the personal message is inserted in the marketing communication;
      transmitting the marketing communication to the recipient of the plurality of recipients, the marketing communication including a set of the sets of variable information based on the profile data corresponding to the recipient and including the personal message;
      receiving a response to the marketing communication from the recipient;
      generating a second marketing communication for the recipient based on the response and the profile data of the recipient; and
      transmitting the second marketing communication to the recipient.

* * * * *